United States Patent
So et al.

(10) Patent No.: US 8,170,159 B2
(45) Date of Patent: May 1, 2012

(54) PREAMBLE NOISE CANCELLATION CIRCUIT

(75) Inventors: Won Wook So, Seoul (KR); Sung Eun Jo, Seoul (KR)

(73) Assignee: Samsung Electro-Mechanics Co., Ltd., Gyunggi-do (KR)

(*) Notice: Subject to any disclaimer, the term of this patent is extended or adjusted under 35 U.S.C. 154(b) by 625 days.

(21) Appl. No.: 12/355,553

(22) Filed: Jan. 16, 2009

(65) Prior Publication Data

US 2010/0054362 A1     Mar. 4, 2010

(30) Foreign Application Priority Data

Aug. 28, 2008   (KR) .................. 10-2008-0084774

(51) Int. Cl.
*H03D 1/04* (2006.01)

(52) U.S. Cl. ........ 375/346; 375/144; 375/148; 375/226; 375/227; 375/296; 375/340; 455/63.1; 455/67.13; 455/114.3; 455/114.2; 455/296; 370/335; 370/342; 327/551

(58) Field of Classification Search .......... 375/144, 375/148, 226, 227, 296, 340, 346; 455/63.1, 455/67.13, 114.2, 114.3, 296, 501; 370/335, 370/342; 327/551
See application file for complete search history.

(56) References Cited

U.S. PATENT DOCUMENTS

| | | | |
|---|---|---|---|
| 6,333,947 B1 * | 12/2001 | van Heeswyk et al. | 375/148 |
| 6,404,824 B1 | 6/2002 | Bell et al. | |
| 7,092,431 B2 * | 8/2006 | Maeda et al. | 375/144 |
| 7,190,749 B2 * | 3/2007 | Levin et al. | 375/346 |

FOREIGN PATENT DOCUMENTS

| | | |
|---|---|---|
| KR | 10-0749447 B1 | 8/2007 |
| WO | 2006/068347 A1 | 6/2010 |

OTHER PUBLICATIONS

Office Action for Korean Application No. 10-2008-0084774 issued on Jun. 11, 2010.

* cited by examiner

*Primary Examiner* — Leon Flores
(74) *Attorney, Agent, or Firm* — Lowe, Hauptman, Ham & Berner, LLP

(57) ABSTRACT

A preamble noise cancellation circuit according to an aspect of the invention may include: a coupler dividing an input signal; a preamble noise detection unit subtracting a predetermined reference preamble signal from a received preamble signal output from the coupler to detect preamble noise included in the received preamble signal; and a noise cancellation unit subtracting the preamble noise detected by the preamble noise detection unit from the received preamble signal output from the coupler.

11 Claims, 3 Drawing Sheets

PREAMBLE NOISE CANCELLATION CIRCUIT

CROSS-REFERENCE TO RELATED APPLICATIONS

This application claims the priority of Korean Patent Application No. 2008-0084774 filed on Aug. 28, 2008, in the Korean Intellectual Property Office, the disclosure of which is incorporated herein by reference.

BACKGROUND OF THE INVENTION

1. Field of the Invention

The present invention relates to preamble noise cancellation circuits, and more particularly, to a preamble noise cancellation circuit that can more accurately perform signal processing using a preamble by cancelling noise included in the preamble of a communication signal (hereinafter, referred to as "preamble noise").

2. Description of the Related Art

In general, with the popularization of mobile digital broadcasting, digital multimedia broadcasting (DMB), digital video broadcasting-handheld (DVB-H), and media-forward link only (media-FLO) receivers have been increasingly provided in cellular phones, navigations, and notebook computers.

However, as individual digital broadcasting systems within general IT equipment have been complicated, various system signals, generated from the general IT equipment, serve as interference signals with respect to an added digital broadcasting system. This causes deterioration in communication quality of the digital broadcasting system. However, a specific solution to overcome the deterioration has not been proposed yet.

The research and development of a technique that removes an interference signal having a very high level has now been conducted.

Currently, examples of a communication system using industrial, scientific and medical (ISM) bands may include applications such as a wireless LAN (WLAN), Bluetooth, and Zigbee. When these communication systems are used by individual users within a predetermined space or operate in a notebook computer or a desktop computer of a single user at the same time, transmission/reception frequencies used in the respective communication systems may be close or overlap. This causes a significant reduction in quality of each of the communication systems.

For example, when the WLAN, the Bluetooth, and the Zigbee systems exist together and are in use within a predetermined space, the WLAN may be used for Internet access and data transmission, a Bluetooth device may be used to perform voice and audio communication and provide an interface to PC peripheral devices.

Further, while devices and equipment are monitored and controlled using the Zigbee, a large amount of data can be transmitted and received using the WLAN. For example, in transmission and reception frequency channels of the WLAN and the Zigbee using the ISM bands at the same time, at least four Zigbee communication channels overlap with one WLAN communication channel. When different devices sharing the ISM bands operate at the same time at a predetermined space, the communication frequencies used by the respective systems may overlap each other or be located within an adjacent frequency band. As a result, the communication signals from other systems serve as interference to each other, which may cause a reduction in communication quality of all of the corresponding systems or make communication impossible.

In order for a communication terminal to restore desired data from the received signal, synchronization between a transmission system and a reception system needs to be a top priority. To this end, a transmission terminal adds a preamble having a predefined format to ensure synchronization of a reception terminal, which is followed by a frame of signal data to be transmitted, and transmits the preamble. The reception terminal checks the preamble first to acquire the synchronization, and can restore desired signal data at a predetermined position. In a case of a received signal injected into an antenna of the receiver through a transmission medium where noise is present, if the injected interference signal has a signal level lower than SNR that the reception system asks for, the receiver can stably detect the preamble to acquire synchronization, and then can restore desired data by performing data processing.

However, when the injected interference signal has a signal level greater than the SNR that the receiver asks for, it may be impossible for the receiver to detect the preamble. Therefore, the receiver cannot acquire synchronization necessary for restoring data, and thus cannot perform data processing. As a result, the receiver cannot receive the data. Even when an error occurs in a data frame field during the transmission, most of the communication systems can restore an original signal by using various coding schemes to overcome the error. However, when the synchronization is not acquired in the preamble field in an early stage of the reception, cyclic redundancy checking (CRC) becomes of no use.

SUMMARY OF THE INVENTION

An aspect of the present invention provides a preamble noise cancellation circuit that can more accurately perform signal processing using a preamble by cancelling noise included in the preamble of a communication signal.

According to an aspect of the present invention, there is provided a preamble noise cancellation circuit including: a coupler dividing an input signal; a preamble noise detection unit subtracting a predetermined reference preamble signal from a received preamble signal output from the coupler to detect preamble noise included in the received preamble signal; and a noise cancellation unit subtracting the preamble noise detected by the preamble noise detection unit from the received preamble signal output from the coupler.

The preamble noise cancellation circuit may further include a preamble detection unit detecting a time at which the received preamble signal is input, and supplying a preamble detection signal to the preamble noise detection unit.

The preamble noise detection unit may operate when the preamble detection signal is input from the preamble detection unit.

The preamble noise detection unit may include a first adder adding the received preamble signal output from the coupler and an inverted signal of the predetermined reference preamble signal to detect the preamble noise.

The preamble noise detection unit may further include a reference preamble generator generating the reference preamble signal and outputting the reference preamble signal to the first adder.

The preamble noise detection unit may further include a level adjuster adjusting the amplitude of the preamble noise detected by the first adder according to a signal coupling ratio of the coupler.

According to another aspect of the present invention, there is provided a preamble noise cancellation circuit including: a coupler dividing an input signal; a preamble noise detection unit subtracting a predetermined reference preamble signal from the received preamble signal output from the coupler to detect preamble noise included in the received preamble signal; a delay unit delaying the received preamble signal output from the coupler by a predetermined amount of time; and a noise cancellation unit subtracting the preamble noise detected by the preamble noise detection unit from the received preamble signal delayed by the delay unit to cancel noise from the received preamble signal.

The preamble noise cancellation circuit may further include a preamble detection unit detecting a time at which the received preamble signal is input, and supplying a preamble detection signal to the preamble noise detection unit.

The preamble noise detection unit may operate when the preamble detection signal is input from the preamble detection unit.

The preamble noise detection unit may include a first adder adding the received preamble signal output from the coupler and an inverted signal of a predetermined reference preamble signal to detect the preamble noise.

The preamble noise detection unit may further include a reference preamble generator generating the reference preamble signal and outputting the reference preamble generator to the first adder.

The preamble noise detection unit may further include a level adjuster adjusting the amplitude of the preamble noise detected by the first adder according to a signal coupling ratio of the coupler.

According to still another aspect of the present invention, there is provided a preamble noise cancellation circuit including: a preamble detection unit detecting a time at which a received preamble signal is input, and outputting a preamble detection signal; a coupler dividing an input signal; a preamble noise detection unit operating when the preamble detection signal is input from the preamble detection unit, and subtracting a predetermined reference preamble signal from the received preamble signal output from the coupler to detect preamble noise included in the received preamble signal; and a noise cancellation unit subtracting the preamble noise detected by the preamble noise detection unit from the received preamble signal output from the coupler to cancel noise from the received preamble signal.

The preamble noise detection unit may include a first adder adding the received preamble signal output from the coupler and an inverted signal of the predetermined reference preamble signal to detect the preamble noise.

The preamble noise detection unit may further include a reference preamble generator generating the reference preamble signal and outputting the reference preamble signal to the first adder.

The preamble noise detection unit may further include a level adjuster adjusting the amplitude of the preamble noise detected by the first adder according to a signal coupling ratio of the coupler.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
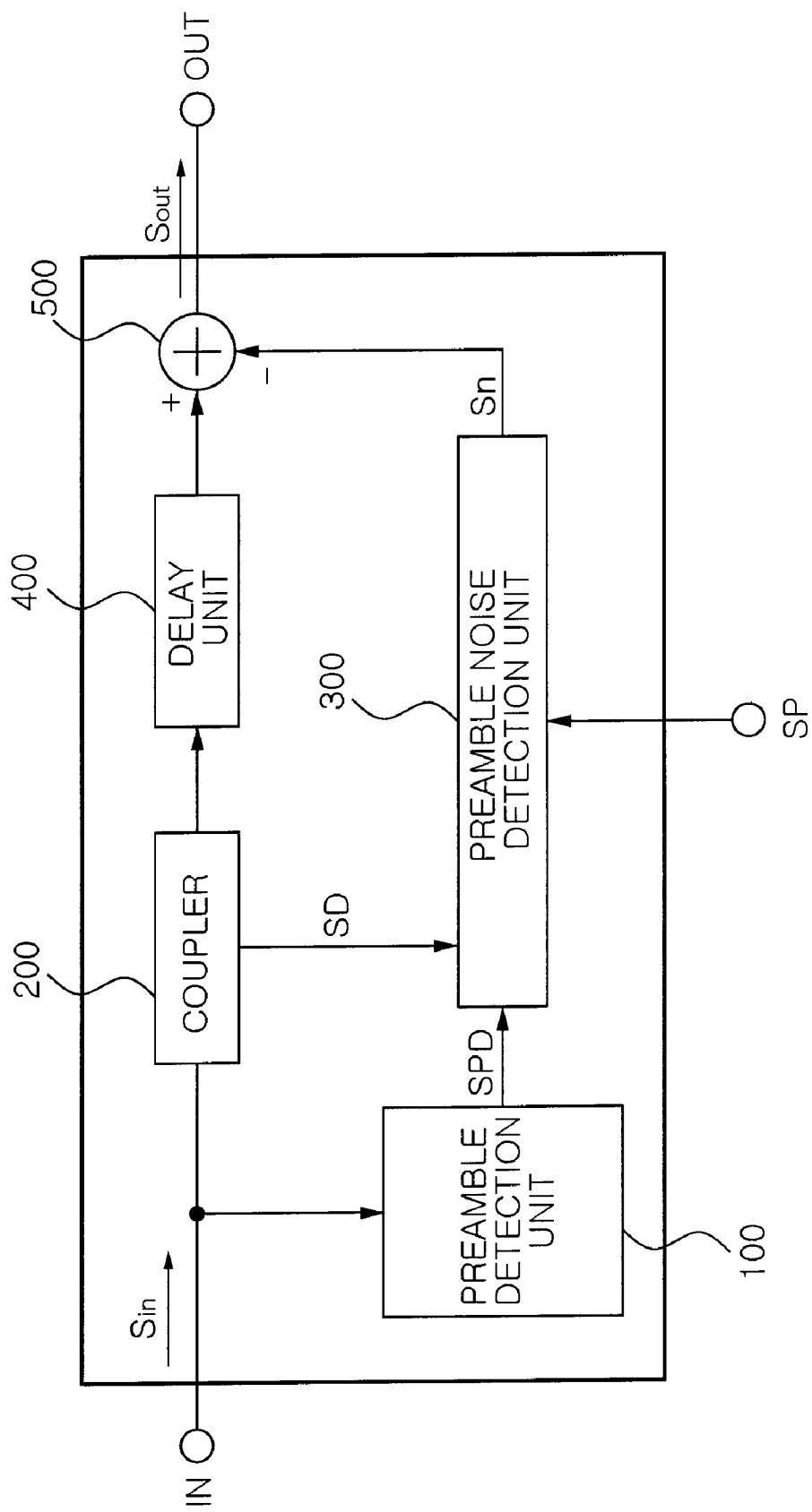
FIG. 1 is a block diagram illustrating a preamble noise cancellation circuit according to an exemplary embodiment of the present invention.

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a block diagram illustrating a preamble noise cancellation circuit according to an exemplary embodiment of the invention.

Referring to FIG. 1, a preamble noise cancellation circuit according to this embodiment includes a coupler 200, a preamble noise detection unit 300, and a noise cancellation unit 500. The coupler 200 divides an input signal. The preamble noise detection unit 300 subtracts a predetermined reference preamble signal SP from a received preamble signal output from the coupler 200 to detect preamble noise Sn in a received preamble signal. The noise cancellation unit 500 subtracts the preamble noise Sn of the preamble noise detection unit 300 from the received preamble signal of the coupler 200 to cancel noise in the received preamble signal.

The preamble noise cancellation circuit according to this embodiment may further include a preamble detection unit 100 that detects a time at which the received preamble signal is input, and outputs a preamble detection signal SPD. Here, the preamble noise detection unit 300 operates when the preamble detection signal SPD is input from the preamble detection unit 100.

Further, the preamble noise cancellation circuit according to this embodiment may include a delay unit 400 that delays the received preamble signal output from the coupler 200 by a predetermined amount of time. Here, the noise cancellation unit 500 subtracts the preamble noise Sn detected by the preamble noise detection unit 300 from the received preamble signal delayed by the delay unit 400 to cancel noise from the received preamble signal.

Figure 2:
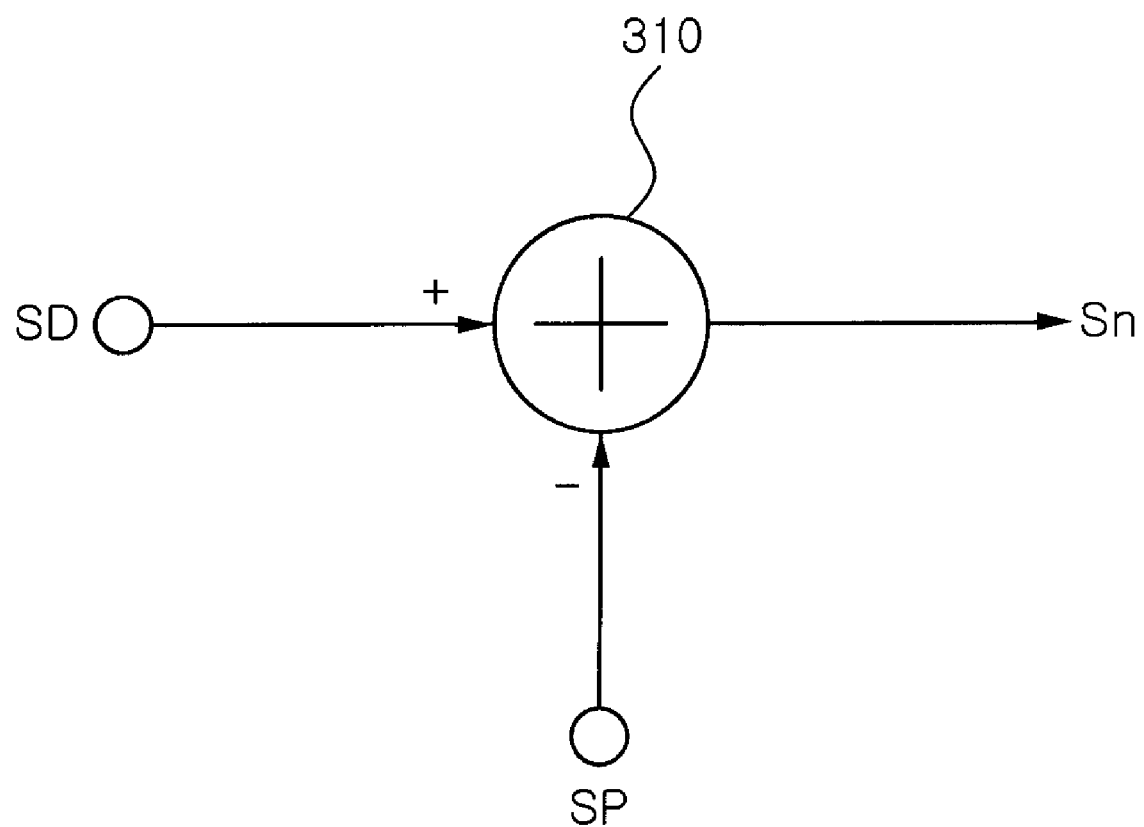
FIG. 2 is a view illustrating a first example of a preamble noise detection unit according to an exemplary embodiment of the present invention.

FIG. 2 is a view illustrating a first example of a preamble noise detection unit according to an exemplary embodiment of the invention.

Referring to FIG. 2, the preamble noise detection unit 300 may include a first adder 310 that adds the received preamble signal SD output from the coupler 200 and an inverted signal of the reference preamble signal SP to detect the preamble noise Sn.

Figure 3:
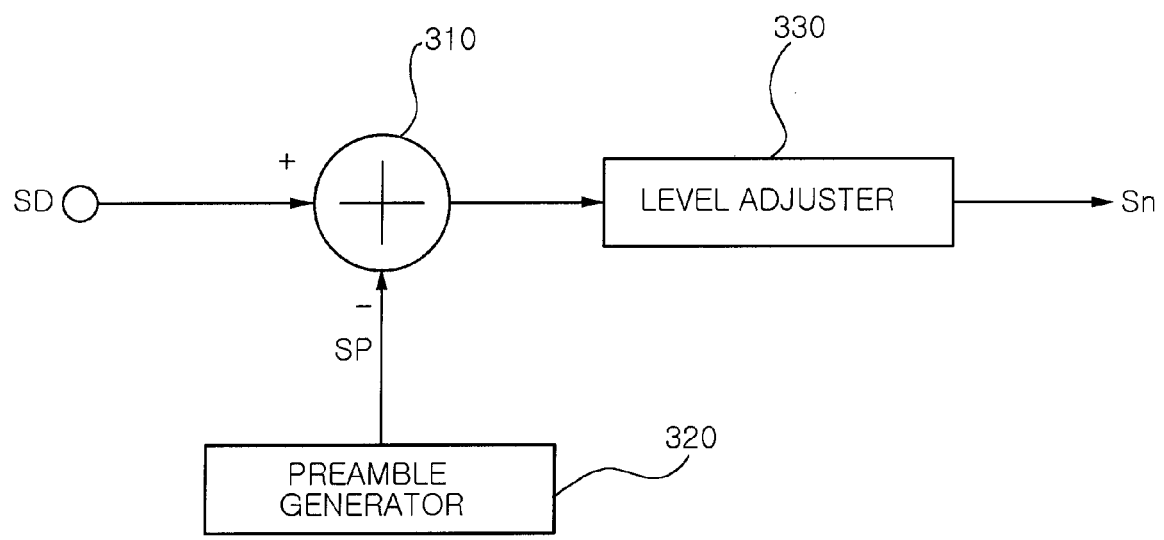
FIG. 3 is a view illustrating a second example of the preamble noise detection unit according to the exemplary embodiment of the present invention.

FIG. 3 is a view illustrating a second example of the preamble noise detection unit according to the exemplary embodiment of the invention.

FIG. 3 is a view illustrating a second example of the preamble noise detection unit according to an exemplary embodiment of the invention.

Referring to FIG. 3, the preamble noise detection unit 300 according to this embodiment may include the first adder 310, a reference preamble generator 320, and a level adjuster 330. The first adder 310 adds the received preamble signal SD output from the coupler 200 and an inverted signal of the predetermined reference preamble signal SP to detect the preamble noise Sn. The reference preamble generator 320 generates the reference preamble signal and outputs the generated reference preamble signal to the first adder 310. The level adjuster 330 adjusts the amplitude of the preamble noise Sn detected by the first adder 310 according to the signal coupling ratio of the coupler 200.

Hereinafter, the operation and effect of the invention will be described in detail with reference to the accompanying drawings.

Referring to FIGS. 1 through 3, the preamble noise cancellation circuit according to this embodiment will be described. In this embodiment, the preamble noise cancellation circuit, shown in FIG. 1, includes the preamble detection unit 100, the coupler 200, the preamble noise detection unit 300, the delay unit 400, and the noise cancellation unit 500.

First, the preamble detection unit 100 detects a time at which a received preamble signal is input, and outputs a preamble detection signal SPD to the preamble noise detection unit 300.

Here, the received preamble signal contains a predetermined preamble code. A preamble signal can be detected using the received preamble signal, which has a predetermined level and a predetermined signal pattern.

The coupler 200 outputs an input signal to the delay unit 400, and at the same time, outputs a signal having predetermined power in the input signal to the preamble noise detection unit 300. That is, the coupler 200 supplies a noisy received signal to a main path connected to the delay unit 400 and a sub path connected to the preamble noise detection unit 300.

The preamble noise detection unit 300 operates when the preamble detection signal SPD is input from the preamble detection unit 100. The preamble noise detection unit 300 subtracts a predetermined reference preamble signal SP from the received preamble signal output from the coupler 200 to detect preamble noise present in the received preamble signal. On the other hand, the preamble noise detection unit 300 does not operate unless the preamble detection signal SPD is not input from the preamble detection unit 100.

As a result, the preamble noise cancellation circuit performs a normal operation only when the preamble signal is input.

The delay unit 400 delays the received preamble signal from the coupler 200 by the predetermined amount time, and outputs the delayed preamble signal to the noise cancellation unit 500.

Here, the noise cancellation unit 500 subtracts the preamble noise Sn detected by the preamble noise detection unit 300 from the received preamble signal of the coupler 200 to cancel noise from the received preamble signal.

The noise cancellation unit 500 outputs a preamble signal from which the preamble noise is cancelled.

The first example of the preamble noise detection unit 300 will be described with reference to FIG. 2.

Referring to FIG. 2, when the preamble noise detection unit 300 includes the first adder 310, the first adder 310 of the preamble noise detection unit 300 adds the received preamble signal SD output from the coupler 200 and an inverted signal of the predetermined reference preamble signal SP to detect the preamble noise Sn.

The second example of the preamble noise detection unit 300 will be described with reference to FIG. 3.

Referring to FIG. 3, when the preamble noise detection unit 300 according to this embodiment includes the first adder 310, the reference preamble generator 320, and the level adjuster 330, the reference preamble generator 320 of the preamble noise detection unit 300 generates the reference preamble signal and outputs the reference preamble signal to the first adder 310. Here, the preamble signal is an RF signal that contains a predetermined preamble code.

The first adder 310 adds the received preamble signal SD output from the coupler 200 and the inverted signal of the reference preamble signal SP from the reference preamble generator 320 to detect the preamble noise Sn and output the preamble noise to the level adjuster 330.

The level adjuster 330 adjusts the amplitude of the preamble noise Sn detected by the first adder 310 according to the signal coupling ratio of the coupler 200.

As described above, the invention is to remove an interference signal affecting communication signals in a communication system. The interference signal present in a preamble of a received signal containing the interference signal is selectively removed to acquire a stable preamble signal. Accordingly, detection of received signals, automatic gain control (AGC), frequency offset estimation, and timing synchronization can be more reliably ensured.

Therefore, desired information included in a data area can be substantially restored. Further, even when noise occurs, the quality of the communication system can be improved regardless of kind, form, or position of interference signals injected in to a receiving antenna or a reception line.

Further, the preamble noise cancellation circuit according to the embodiment of the invention can be applied to both an RF frequency stage and a baseband stage. Alternatively, the preamble noise cancellation circuit may have a hybrid structure that can be applied to an RF frequency stage and a baseband stage at the same time.

As set forth above, according to an exemplary embodiment of the invention, noise present in a preamble of a communication signal is cancelled, so that signal processing using the preamble and time synchronization can be more accurately performed.

While the present invention has been shown and described in connection with the exemplary embodiments, it will be apparent to those skilled in the art that modifications and variations can be made without departing from the spirit and scope of the invention as defined by the appended claims.

What is claimed is:

1. A preamble noise cancellation circuit, comprising: a coupler for dividing an input signal; a preamble noise detection unit for subtracting a predetermined reference preamble signal from a received preamble signal output from the coupler to detect preamble noise included in the received preamble signal, wherein the preamble noise detection unit comprises a level adjuster for adjusting the amplitude of the preamble noise detected by a first adder according to a signal coupling ratio of the coupler; a noise cancellation unit for subtracting the preamble noise detected by the preamble noise detection unit from the received preamble signal output from the coupler; and a preamble detection unit for detecting a time at which the received preamble signal is input, and supplying a preamble detection signal to the preamble noise detection unit.

2. The preamble noise cancellation circuit of claim 1, wherein the preamble noise detection unit is arranged to operate when the preamble detection signal is input from the preamble detection unit.

3. The preamble noise cancellation circuit of claim 1, wherein the preamble noise detection unit comprises the first adder for adding the received preamble signal output from the coupler to an inverted signal of the predetermined reference preamble signal to detect the preamble noise.

4. The preamble noise cancellation circuit of claim 3, wherein the preamble noise detection unit further comprises a reference preamble generator for generating the reference preamble signal and outputting the reference preamble signal to the first adder.

5. A preamble noise cancellation circuit, comprising: a coupler for dividing an input signal; a preamble noise detection unit for subtracting a predetermined reference preamble signal from the received preamble signal output from the coupler to detect preamble noise included in the received preamble signal, wherein the preamble noise detection unit comprises a level adjuster for adjusting the amplitude of the preamble noise detected by a first adder according to a signal coupling ratio of the coupler; a delay unit for delaying the received preamble signal output from the coupler by a predetermined amount of time; a noise cancellation unit for subtracting the preamble noise detected by the preamble noise detection unit from the received preamble signal delayed by the delay unit to cancel noise from the received preamble signal; and a preamble detection unit for detecting a time at which the received preamble signal is input, and supplying a preamble detection signal to the preamble noise detection unit.

6. The preamble noise cancellation circuit of claim 5, wherein the preamble noise detection unit is arranged to operate when the preamble detection signal is input from the preamble detection unit.

7. The preamble noise cancellation circuit of claim 5, wherein the preamble noise detection unit comprises the first adder for adding the received preamble signal output from the coupler to an inverted signal of a predetermined reference preamble signal to detect the preamble noise.

8. The preamble noise cancellation circuit of claim 7, wherein the preamble noise detection unit further comprises a reference preamble generator for generating the reference preamble signal and outputting the reference preamble generator to the first adder.

9. A preamble noise cancellation circuit, comprising: a preamble detection unit for detecting a time at which a received preamble signal is input, and outputting a preamble detection signal, wherein the preamble noise detection unit further comprises a level adjuster for adjusting the amplitude of the preamble noise detected by a first adder according to a signal coupling ratio of the coupler; the coupler for dividing an input signal; a preamble noise detection unit operable when the preamble detection signal is input from the preamble detection unit, for subtracting a predetermined reference preamble signal from the received preamble signal output from the coupler to detect preamble noise included in the received preamble signal; and a noise cancellation unit for subtracting the preamble noise detected by the preamble noise detection unit from the received preamble signal output from the coupler to cancel noise from the received preamble signal.

10. The noise cancellation circuit of claim 9, wherein the preamble noise detection unit comprises the first adder for adding the received preamble signal output from the coupler to an inverted signal of the predetermined reference preamble signal to detect the preamble noise.

11. The noise cancellation circuit of claim 10, wherein the preamble noise detection unit further comprises a reference preamble generator for generating the reference preamble signal and outputting the reference preamble signal to the first adder.

* * * * *